United States Patent
Park et al.

(10) Patent No.: US 10,965,455 B2
(45) Date of Patent: Mar. 30, 2021

(54) DEVICE AND METHOD FOR SECURE CONNECTION

(71) Applicant: Samsung Electronics Co., Ltd., Suwon-si (KR)

(72) Inventors: Chol-Seo Park, Seoul (KR); Eun-Jik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 16/153,252

(22) Filed: Oct. 5, 2018

(65) Prior Publication Data

US 2019/0074964 A1 Mar. 7, 2019

Related U.S. Application Data

(62) Division of application No. 14/887,690, filed on Oct. 20, 2015, now Pat. No. 10,164,775.

(30) Foreign Application Priority Data

Oct. 21, 2014 (KR) .......................... 10-2014-0142627

(51) Int. Cl.
*G06F 21/44* (2013.01)
*H04L 9/08* (2006.01)
(Continued)

(52) U.S. Cl.
CPC .......... *H04L 9/0869* (2013.01); *G06F 21/445* (2013.01); *H04L 9/0838* (2013.01);
(Continued)

(58) Field of Classification Search
CPC ....... G06F 21/445; H04L 9/0869; H04W 4/80
See application file for complete search history.

(56) References Cited

U.S. PATENT DOCUMENTS 7,284,123 B2 10/2007 Kim
8,112,066 B2 2/2012 Ayed
(Continued)

FOREIGN PATENT DOCUMENTS

| CN | 103686713 A | 3/2014 |
|----|-------------|--------|
| EP | 1 439 661 A1 | 7/2004 |
| WO | 2013-100912 A1 | 7/2013 |

OTHER PUBLICATIONS

Chinese Office Action dated Nov. 18, 2019, issued in Chinese Application No. 201510685718.3.
(Continued)

*Primary Examiner* — Jason Chiang
(74) *Attorney, Agent, or Firm* — Jefferson IP Law, LLP

(57) ABSTRACT

An electronic device is provided. The electronic device includes a first short-range communication module configured to execute short-range communication with a second electronic device, a security module configured to store security information, and a processor configured to receive, from the second electronic device, a pairing key that registers the electronic device as being linked to the second electronic device, transmit session key generation information to the second electronic device when authentication with the second electronic device is completed based on the pairing key, generate a session key based on the session key generation information, encrypt the security information based on the session key, and transmit the encrypted information to the second electronic device.

9 Claims, 9 Drawing Sheets

(51) Int. Cl.
*H04W 4/80* (2018.01)
*H04W 12/04* (2021.01)
*H04L 29/06* (2006.01)
*H04W 12/00* (2021.01)
*H04W 12/06* (2021.01)
*H04W 12/02* (2009.01)

(52) U.S. Cl.
CPC ........... *H04L 63/0853* (2013.01); *H04W 4/80* (2018.02); *H04W 12/0013* (2019.01); *H04W 12/04* (2013.01); *H04W 12/04031* (2019.01); *H04L 2463/061* (2013.01); *H04W 12/00502* (2019.01); *H04W 12/02* (2013.01); *H04W 12/06* (2013.01)

(56) References Cited

U.S. PATENT DOCUMENTS

| | | |
|---|---|---|
| 8,494,165 B1 | 7/2013 | Monica et al. |
| 8,494,576 B1 | 7/2013 | Bye et al. |
| 8,738,898 B2 | 5/2014 | Herwono et al. |
| 8,831,224 B2 | 9/2014 | Bai et al. |
| 8,874,913 B1 | 10/2014 | Monica et al. |
| 8,880,881 B2 | 11/2014 | Morel et al. |
| 9,032,501 B1* | 5/2015 | Martin ................. H04L 63/0861 726/10 |
| 2003/0061477 A1 | 3/2003 | Kahn et al. |
| 2004/0147246 A1 | 7/2004 | Kim |
| 2006/0153386 A1* | 7/2006 | Ksontini ............ H04N 21/4367 380/277 |
| 2007/0251997 A1* | 11/2007 | Brown ................. G06K 7/0008 235/380 |
| 2008/0016368 A1* | 1/2008 | Adams ................. H04W 12/06 713/183 |
| 2008/0016537 A1* | 1/2008 | Little .................. H04W 12/003 725/81 |
| 2008/0065892 A1* | 3/2008 | Bailey ................... H04L 9/3228 713/171 |
| 2009/0287922 A1 | 11/2009 | Herwono et al. |
| 2010/0023747 A1* | 1/2010 | Asnaashari ........ G06Q 20/3563 713/150 |
| 2010/0220856 A1* | 9/2010 | Kruys ................... H04L 9/0833 380/44 |
| 2012/0311330 A1* | 12/2012 | Zhang ............... H04W 12/0608 713/168 |
| 2013/0009756 A1 | 1/2013 | Lu |
| 2013/0132286 A1* | 5/2013 | Schaefer ................ H04W 4/44 705/305 |
| 2013/0182845 A1 | 7/2013 | Monica et al. |
| 2013/0185559 A1 | 7/2013 | Morel et al. |
| 2013/0225074 A1 | 8/2013 | Charles |
| 2014/0079217 A1* | 3/2014 | Bai ...................... H04L 63/0869 380/270 |
| 2014/0141721 A1 | 5/2014 | Kim et al. |
| 2014/0208384 A1* | 7/2014 | Youssefian .......... H04L 63/0869 726/3 |
| 2014/0244723 A1 | 8/2014 | Gong et al. |
| 2016/0085960 A1* | 3/2016 | Priev ..................... H04L 9/0861 726/7 |

OTHER PUBLICATIONS

Lee et al., "Communication-Efficient Three-Party Protocols for Authentication and Key Agreement", Computers and Mathematics with Applications, Aug. 1, 2009, vol. 58, No. 4.
"Specification of the Bluetooth System", Specification vol. 1, Wireless Connections Made Easy, Dec. 1, 1999.
Fouladgar et al., "Tiny 3-TLS: A Trust Delegation Protocol for Wireless Sensor Networks", Jan. 1, 2007.
Aymen et al., "Server Assisted Key Establishment for WSN: A MIKEY-Ticket Approach", 2013 12th IEEE International Conference on Trust, Security and Privacy in Computing and Communications, Jul. 16, 2013.

* cited by examiner

DEVICE AND METHOD FOR SECURE CONNECTION

CROSS-REFERENCE TO RELATED APPLICATION(S)

This application is a divisional application of prior application Ser. No. 14/887,690, filed on Oct. 20, 2015 and was based on and claimed priority under 35 U.S.C § 119(a) of a Korean patent application number 10-2014-0142627, filed on Oct. 21, 2014, in the Korean Intellectual Property Office, the disclosure of which is incorporated by reference herein in its entirety.

TECHNICAL FIELD

The present disclosure relates to a device and a method for a secure connection. More particularly, the present disclosure relates to a device and a method for a secure connection, which securely transmits security information of a first electronic device to a second electronic device, so that services are conveniently executed using the second electronic device.

BACKGROUND

A Near field communication (NFC) service is currently operated in three types of modes, which are card emulation, peer to peer (P2P), and read/write. Out of the three mode types, the card emulation mode is used for NFC payment service.

In the card emulation mode, NFC payment services, such as, a transportation card payment service, a check card payment service, and the like, may be executed using an electronic device by transmitting security information stored in a security chip (an embedded secure element (eSE) chip, a universal integrated circuit card (UICC) chip, or a host card emulation (HCE) chip) to an NFC reader through an NFC chip.

In the card emulation mode, communication between the security chip (an eSE chip, a UICC chip, or an HCE chip) and the NFC chip should be directly connected. For example, the security chip (an eSE chip, a UICC chip, or an HCE chip) should be connected with the NFC chip from the perspective of hardware (H/W) in one electronic device so that the security information stored in the security chip is transmitted to the NFC reader through the NFC chip, or the security chip should be connected with the NFC chip through a processor (application processor (AP)) in one electronic device.

When a user possesses a plurality of electronic devices, for example, a smart phone, a watch phone, and a tablet, a security chip (an embedded secure element (eSE) chip, a universal integrated circuit card (UICC) chip, or a host card emulation (HCE) chip) and a near field communication (NFC) chip required for NFC payment service should be included in each of the plurality of electronic devices. For example, when an eSE/UICC/HCU chip and an NFC chip for NFC payment service are included in only the smart phone, a user should proceed with payment service using the smart phone although the smart phone is connected with the watch phone through Bluetooth.

Therefore, a need exists for a device and a method for a secure connection, which securely transmits security information of a first electronic device to a second electronic device, so that services are conveniently executed using the second electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device and a method for a secure connection, which securely transmits security information of a first electronic device to a second electronic device, so that services are conveniently executed using the second electronic device.

In accordance with an aspect of the present disclosure, an electronic device is provided. The electronic device includes a first short-range communication module configured to execute short-range communication with a second electronic device, a security module configured to store security information, and a processor configured to receive, from the second electronic device, a pairing key that registers the electronic device as being linked to the second electronic device, transmit session key generation information to the second electronic device when authentication with the second electronic device is completed based on the pairing key, generate a session key based on the session key generation information, encrypt the security information based on the session key, and transmit the encrypted information to the second electronic device.

In accordance with another aspect of the present disclosure, an electronic device is provided. The electronic device includes a first short-range communication module configured to execute short-range communication with a first electronic device, a second short-range communication module configured to execute short-range communication with a third electronic device, and a processor configured to transmit, when a pairing key that registers the first electronic device as being linked to the electronic device is received from a server device, the pairing key to the first electronic device, transmit session key generation information received from the first electronic device to the server device, decode encrypted security information that is received from the first electronic device, based on a session key received from the server device, and transmit the decoded information to the third electronic device.

In accordance with another aspect of the present disclosure, a server device is provided. The server device includes a processor configured to generate and store a pairing key for registering a first electronic device as being linked to an electronic device, based on unique information of the first electronic device received from the electronic device, and transmit the pairing key to the electronic device, and generate a session key identical to a session key of the first electronic device based on session key generation information of the first electronic device received from the electronic device, and transmit the session key to the electronic device.

In accordance with another aspect of the present disclosure, a secure connection method of an electronic device is provided. The secure connection method includes receiving a pairing key that registers the electronic device as being linked to a second electronic device from the second electronic device that is connected over a first short-range communication, transmitting session key generation information to the second electronic device when authentication with respect to the second electronic device is completed based on the pairing key, and generating a session key based on the session key generation information, encrypting security information through the session key, and transmitting the encrypted information to the second electronic device.

In accordance with another aspect of the present disclosure, a secure connection method of an electronic device is provided. The secure connection method includes transmitting, when a pairing key that registers a first electronic device as being linked to the electronic device, is received from a server device, the pairing key to the first electronic device that is connected over a first short-range communication, transmitting, to the server device, session key generation information received from the first electronic device, and decoding, when a session key is received from the server device, encrypted security information that is received from the first electronic device, based on the session key, and transmitting the decoded information to a third electronic device that is connected over a second short-range communication.

In accordance with another aspect of the present disclosure, a secure connection method of a server device is provided. The secure connection method includes generating and storing, when unique information of a first electronic device is received from an electronic device, a pairing key for registering the first electronic device as being linked to the electronic device, based on the unique information of the first electronic device, and transmitting the pairing key to the electronic device, and generating, when session key generation information of the first electronic device is received from the electronic device, a session key identical to a session key of the first electronic device based on the session key generation information, and transmitting the session key to the electronic device.

A secure connection device and method, according to various embodiments of the present disclosure, securely provides security information of the first electronic device to a second electronic device, so that services are conveniently executed using the second electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
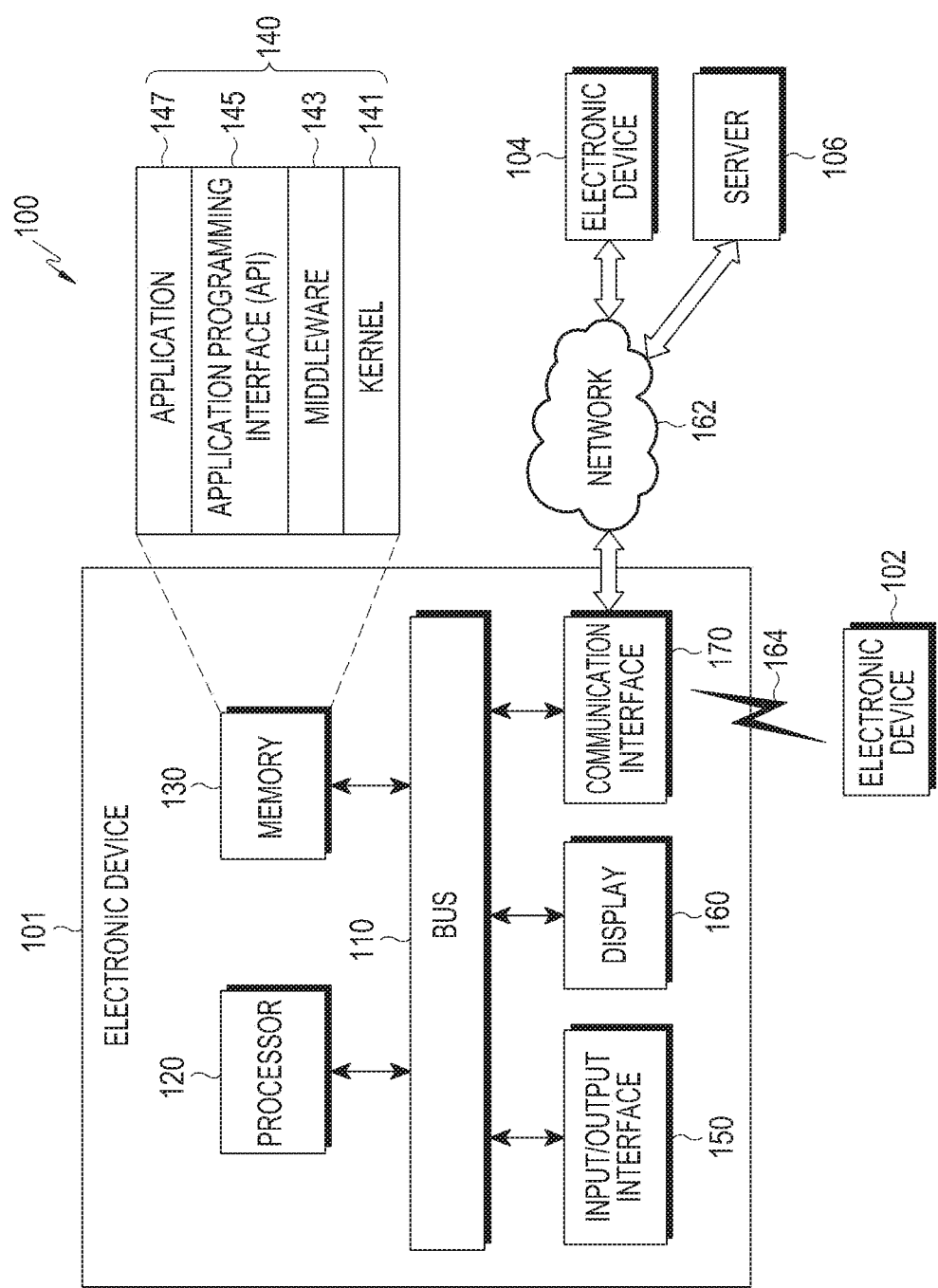
FIG. 1 illustrates a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In embodiments of the present disclosure, the expression "have", "may have", "include" or "may include" refers to existence of a corresponding feature (for example, a numerical value, a function, an operation, or components, such as elements), and does not exclude existence of additional features.

In embodiments of the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

When it is mentioned that one element (for example, a first element) is "(operatively or communicatively) coupled with/to or connected to" another element (for example, a second element), it should be construed that the one element is directly connected to the another element or the one element is indirectly connected to the another element via yet another element (for example, a third element). In contrast, it may be understood that when an element (for example, the first element) is referred to as being "directly connected," or "directly coupled" to another element (second element), there are no element (for example, the third element) interposed between them.

The expression "configured to" used in embodiments of the present disclosure may be exchanged with, for example, "suitable for", "having the capacity to", "designed to", "adapted to", "made to", or "capable of" according to the situation. The term "configured to" may not necessarily imply "specifically designed to" in hardware (HAY). Alternatively, in some situations, the expression "device configured to" may mean that the device, together with other devices or components, "is able to". For example, the phrase "processor adapted (or configured) to perform A, B, and C" may mean a dedicated processor (for example, an embedded processor) only for performing the corresponding operations or a generic-purpose processor (for example, a central processing unit (CPU) or an application processor (AP)) that can perform the corresponding operations by executing one or more software (S/W) programs stored in a memory device.

The terms used herein are merely for the purpose of describing particular embodiments of the present disclosure and are not intended to limit the scope of other embodiments. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in embodiments of the present disclosure. In some cases, even the term defined in embodiments of the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical appliance, a camera, and a wearable device (for example, a head-mounted-device (HMD), such as electronic glasses, electronic clothes, an electronic bracelet, an electronic necklace, an electronic appcessory, electronic tattoos, a smart watch, and the like).

According to various embodiments of the present disclosure, the electronic device may be a smart home appliance. The home appliance may include at least one of, for example, a television (TV), a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ and PlayStation™), an electronic dictionary, an electronic key, a camcorder, and an electronic photo frame.

According to an embodiment of the present disclosure, the electronic device may include at least one of various medical devices (for example, various portable medical measuring devices (a blood glucose monitoring device, a heart rate monitoring device, a blood pressure measuring device, a body temperature measuring device, and the like), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (for example, a navigation device for a ship, and a gyro-compass), avionics, security devices, an automotive head unit, a robot for home or industry, an automatic teller's machine (ATM) in banks, point of sales (POS) in a shop, or internet device of things (for example, a light bulb, various sensors, electric or gas meter, a sprinkler device, a fire alarm, a thermostat, a streetlamp, a toaster, a sporting goods, a hot water tank, a heater, a boiler, and the like).

According to various embodiments of the present disclosure, the electronic device may include at least one of a part of furniture or a building/structure, an electronic board, an electronic signature receiving device, a projector, and various kinds of measuring instruments (for example, a water meter, an electric meter, a gas meter, and a radio wave meter). The electronic device according to various embodiments of the present disclosure may be a combination of one or more of the aforementioned various devices. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. As used herein, the term "user" may indicate a person who uses an electronic device or a device (for example, an artificial intelligence electronic device) that uses an electronic device.

FIG. 1 illustrates a network environment according to various embodiments of the present disclosure.

Referring to FIG. 1, an electronic device 101 in a network environment 100, according to various embodiments of the present disclosure, will be described.

Referring to FIG. 1, the electronic device 101 may include a bus 110, a processor 120, a memory 130, an input/output interface 150, a display 160, and a communication interface 170. In an embodiment of the present disclosure, the electronic device 101 may omit at least some of the above elements or may further include other elements.

The bus 110 may include, for example, a circuit for connecting the elements 110 to 170 each other, and transferring communication (for example, a control message and/or data) between the elements.

The processor 120 may include one or more of a CPU, an AP, and a communication processor (CP). The processor 120 may control, for example, at least one other element of the electronic device 101 and/or process calculation or data processing associated with communication.

The memory 130 may include a volatile memory and/or a non-volatile memory. The memory 130 may store, for example, instructions or data related to at least one other element of the electronic device 101. According to an embodiment of the present disclosure, the memory 130 may store S/W and/or a program 140. The program 140 may include, for example, a kernel 141, middleware 143, an application programming interface (API) 145, and/or an application program (or application) 147. At least some of the kernel 141, the middleware 143, and the API 145 may be referred to as an operating system (OS).

The kernel 141 may control or manage system resources (for example, the bus 110, the processor 120, or the memory 130) used for executing an operation or function implemented by other programs (for example, the middleware 143, the API 145, or the application program 147). Furthermore, the kernel 141 may provide an interface through which the middleware 143, the API 145, or the application program 147 may access individual elements of the electronic device 101 to control or manage system resources.

The middleware 143 may serve as an intermediary such that, for example, the API 145 or the application program 147 communicate with the kernel 141 to transmit/receive data. Furthermore, in regard to task requests received from the application program 147, the middleware 143 may perform a control (for example, scheduling or load balancing) for the task requests using, for example, a method of assigning, to at least one application, a priority for using the system resources (for example, the bus 110, the processor 120, or the memory 130) of the electronic device 101.

The API 145 is an interface by which the applications 147 control functions provided from the kernel 141 or the middleware 143, and may include, for example, at least one interface or function (for example, instructions) for file control, window control, image processing, or text control.

The input/output interface 150 may serve as an interface which may transmit instructions or data input from a user or another external device to other element(s) of the electronic device 101. Further, the input/output interface 150 may output instructions or data received from other element(s) of the electronic device 101 to a user or another external device.

The display 160 may include, for example, a liquid crystal display (LCD), a light emitting diode (LED) display, an organic LED (OLED) display, a micro electro mechanical system (MEMS) display, or an electronic paper display. The display 160 may display various types of contents (for example, text, images, videos, icons, or symbols) for users. The display 160 may include a touch screen, and may receive, for example, a touch, gesture, proximity, or hovering input using an electronic pen or a user's body part.

The communication interface 170 may establish communication between, for example, the electronic device 101 and an external device (for example, a first external electronic device 102, a second external electronic device 104, or a server 106). For example, the communication interface 170 may be connected to a network 162 through wireless or wired communication so as to communicate with the external device (for example, the second external electronic device 104 or the server 106). In another example, the communication interface 170 may be connected to the first external electronic device 102 through a wireless communication 164.

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. The wired communication may include, for example, at least one of a universal serial bus (USB), a high definition multimedia interface (HDMI), recommended standard 232 (RS-232), and a plain old telephone service (POTS). The network 162 may include at least one of communication networks, such as a computer network (for example, a local area network (LAN) or a wide area network (WAN)), the Internet, and a telephone network.

Each of the first external electronic device 102 and the second external electronic device 104 may be a device that is the same as or different from the electronic device 101. According to an embodiment of the present disclosure, the server 106 may include a group of one or more servers. According to various embodiments of the present disclosure, some or all of the operations executed in the electronic device 101 may be executed by another electronic device or by a plurality of electronic devices (for example, the first external electronic device 102 or the second external electronic device 104, or the server 106). According to an embodiment of the present disclosure, when the electronic device 101 should perform a function or service automatically or by request, the electronic device 101 may request another device (for example, the first external electronic device 102 or the second external electronic device 104, or the server 106) to perform at least some function related to the function or service, instead of or in addition to performing the function or service by itself. The other electronic device (for example, the first external electronic device 102 or the second external electronic device 104 or the server 106) may execute the requested function or additional function, and may transmit a result thereof to the electronic device 101. The electronic device 101 may provide the requested function or service based on the received result as it is or after additionally processing the received result. To this end, for example, cloud computing, distributed computing, or client-server computing technology may be used.

Figure 2:
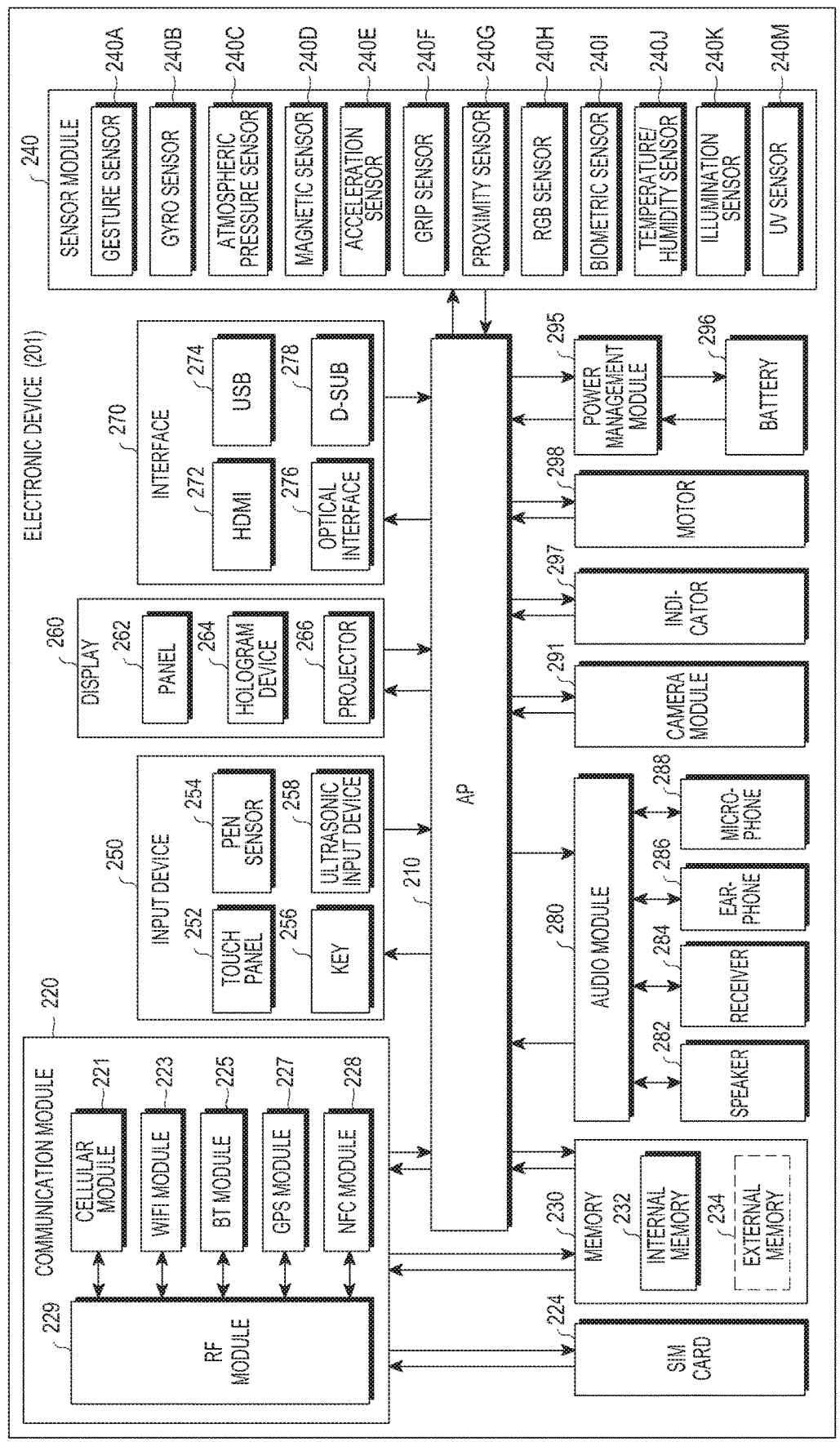
FIG. 2 is a block diagram of an electronic device according to various embodiments of the present disclosure.

FIG. 2 is a block diagram of an electronic apparatus according to various embodiments of the present disclosure.

Referring to FIG. 2, an electronic device 201 may include, for example, a part or the entirety of the electronic device 101 illustrated in FIG. 1. The electronic device 201 may include at least one AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may control a plurality of H/W or S/W elements connected thereto by driving an operating system or an application program, and may perform a variety of data processing and calculations. The AP 210 may be embodied as, for example, a system on chip (SoC). According to an embodiment of the present disclosure, the AP 210 may further include a graphics processing unit (GPU) and/or an image signal processor. The AP 210 may include at least some of the elements (for example, a cellular module 221) illustrated in FIG. 2. The AP 210 may load instructions or data, received from at least one other element (for example, a non-volatile memory), in a volatile memory to process the loaded instructions or data, and may store various types of data in a non-volatile memory.

The communication module 220 may have a configuration equal or similar to the communication interface 170 of FIG. 1. The communication module 220 may include, for example, a cellular module 221, a Wi-Fi module 223, a Bluetooth (BT) module 225, a GPS module 227, a near field communication (NFC) module 228, and a radio frequency (RF) module 229.

The cellular module 221 may provide a voice call, a video call, text message services, or Internet services through, for example, a communication network. According to an embodiment of the present disclosure, the cellular module 221 may distinguish and authenticate electronic devices 201 in a communication network using a subscriber identification module (for example, the SIM card 224). According to an embodiment of the present disclosure, the cellular module 221 may perform at least some of the functions which may be provided by the AP 210. According to an embodiment of the present disclosure, the cellular module 221 may include a CP.

The Wi-Fi module 223, the BT module 225, the GPS module 227, and the NFC module 228 may include, for example, a processor for processing data transmitted/received through a corresponding module. According to any embodiment of the present disclosure, at least some (two or more) of the cellular module 221, the Wi-Fi module 223, the BT module 225, the GPS module 227, and the NFC module 228 may be included in one integrated chip (IC) or IC package.

The RF module 229 may transmit/receive, for example, a communication signal (for example, an RF signal). The RF module 229 may include, for example, a transceiver, a power amp module (PAM), a frequency filter, a low noise amplifier (LNA) or an antenna. According to an embodiment of the present disclosure, at least one of the cellular module 221, the Wi-Fi module 223, the BT module 225, the global navigation satellite system (GNSS) module 227, and the NFC module 228 may transmit and receive RF signals through a separate RF module.

The SIM card 224 may include a card that contains a SIM and/or an embedded SIM, and may contain unique identification information (for example, an IC card identifier (ICCID)) or subscriber information (for example, an international mobile subscriber identity (IMSI)).

The memory 230 may include, for example, an embedded memory 232 or an external memory. The embedded memory 232 may include at least one of, for example, a volatile memory (for example, a dynamic random access memory (DRAM), a static RAM (SRAM), a synchronous DRAM (SDRAM), and the like) and a non-volatile memory (for example, a one time programmable read only memory (OTPROM), a PROM, an erasable and programmable ROM (EPROM), an electrically erasable and programmable ROM (EEPROM), a flash memory (for example, a NAND flash memory or a NOR flash memory), a hard drive, or a solid state drive (SSD).

The external memory 234 may further include a flash drive, for example, a compact flash (CF), a secure digital (SD), a micro-SD, a mini-SD, an extreme digital (xD), a memory stick, and the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, red, green, and blue (RGB) sensor), a biometric sensor 240I, a temperature/humidity sensor 240J, an illumination sensor 240K, and an ultra violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 240 may further include a control circuit for controlling at least one sensor included therein. In an embodiment of the present disclosure, the electronic device 201 may further include a processor configured to control the sensor module 240 as a part of or separately from the AP 210, and may control the sensor module 240 while the AP 210 is in a sleep mode.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. The touch panel 252 may further include a control circuit. The touch panel 252 may further include a tactile layer, and may provide a tactile reaction to a user.

The (digital) pen sensor 254 may include, for example, a recognition sheet which is a part of the touch panel or a separate recognition sheet. The key 256 may include, for example, a physical button, an optical key or a keypad. The ultrasonic input device 258 may determine data by detecting an ultrasonic wave generated by an input unit, using a microphone (for example, a microphone 288) of the electronic device 201.

The display 260 (for example, the display 160) may include a panel 262, a hologram device 264 or a projector 266. The panel 262 may include an element equal or similar to the display 160 of FIG. 1. The panel 262 may be embodied to be, for example, flexible, transparent, or wearable. The panel 262 may also be configured to be integrated with the touch panel 252 as a single module. The hologram device 264 may show a stereoscopic image in the air by using interference of light. The projector 266 may project light onto a screen to display an image. The screen may be located, for example, inside or outside the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included in, for example, the communication interface 170 illustrated in FIG. 1. Additionally or alternatively, the interface 270 may include, for example, a mobile high-definition link (MHL) interface, an SD card/multi-media card (MMC) interface, or an Infrared Data Association (IrDA) standard interface.

The audio module 280 may bilaterally convert, for example, a sound and an electrical signal. At least some elements of the audio module 280 may be included in, for example, the input/output interface 150 illustrated in FIG. 1. The audio module 280 may process sound information input or output through, for example, a speaker 282, a receiver 284, earphones 286, the microphone 288, and the like.

The camera module 291 is a device which is capable of photographing a still image and a video image. According to an embodiment of the present disclosure, the camera module 291 may include one or more image sensors (for example, a front sensor or a back sensor), a lens, an image signal processor (ISP) or a flash (for example, LED or xenon lamp).

The power management module 295 may manage, for example, power of the electronic device 201. According to an embodiment of the present disclosure, the power management module 295 may include a power management IC (PMIC), a charger IC, or a battery or fuel gauge. The PMIC may have a wired and/or wireless charging scheme.

Examples of the wireless charging method may include, for example, a magnetic resonance method, a magnetic induction method, an electromagnetic method, and the like. Additional circuits (for example, a coil loop, a resonance circuit, a rectifier, and the like) for wireless charging may be further included. The battery gauge may measure, for example, the residual quantity of battery 296, a charging voltage, current, or temperature. The battery 296 may include, for example, a rechargeable battery and/or a solar battery.

The indicator 297 may show particular statuses of the electronic device 201 or a part (for example, AP 210) of the electronic device 201, for example, a boot-up status, a message status, a charging status, and the like. The motor 298 may convert an electrical signal into mechanical vibrations, and may generate a vibration or haptic effect. Although not illustrated, the electronic device 201 may include a processing unit (for example, a GPU) for supporting mobile TV. The processing device for supporting mobile TV may process media data according to a standard of digital multimedia broadcasting (DMB), digital video broadcasting (DVB), media flow, and the like.

Each of the components of the electronic device according to the present disclosure may be implemented by one or more components and the name of the corresponding component may vary depending on a type of the electronic device. In various embodiments of the present disclosure, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

Figure 3:
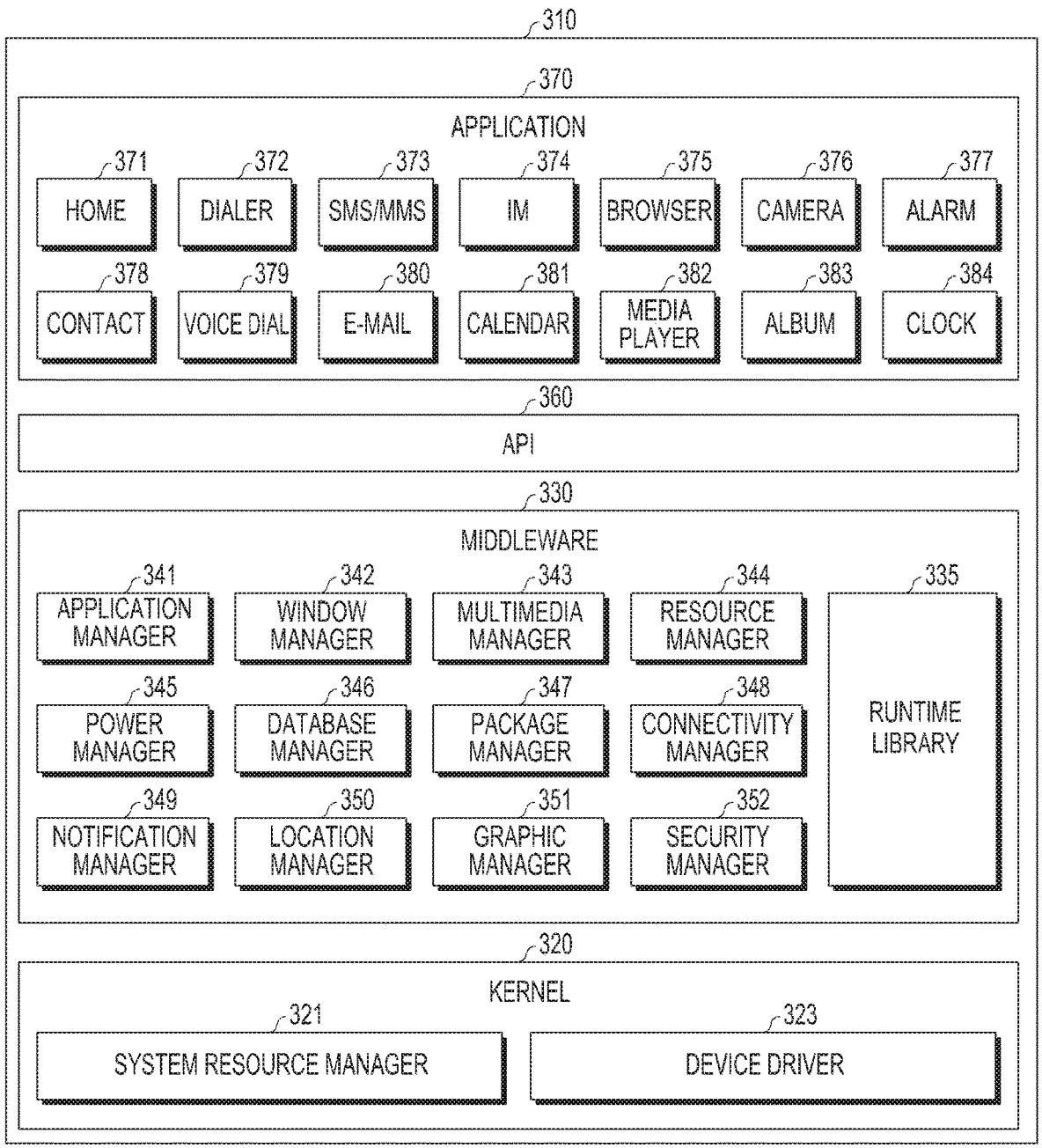
FIG. 3 is a block diagram of a programming module according to various embodiments of the present disclosure.

FIG. 3 is a block diagram of a program module according to various embodiments of the present disclosure.

Referring to FIG. 3, according to an embodiment of the present disclosure, a program module 310 (for example, the program 140) may include an OS for controlling resources related to an electronic device (for example, the electronic device 101) and/or various applications (for example, the application programs 147) executed in the operating system. The operating system may be, for example, Android, iOS, Windows, Symbian, Tizen, Bada, and the like.

The programming module 310 may include a kernel 320, middleware 330, an API 360, and/or an application 370. At least some of the program module 310 may be preloaded in an electronic device or downloaded from a server (for example, the server 106).

The kernel 320 (for example, the kernel 141) may include, for example, a system resource manager 321 or a device driver 323. The system resource manager 321 may control, allocate, or collect the system resources. According to an embodiment of the present disclosure, the system resource manager 321 may include a process manager, a memory manager, a file system manager, and the like. The device driver 323 may include, for example, a display driver, a camera driver, a BT driver, a shared-memory driver, a USB driver, a keypad driver, a Wi-Fi driver, an audio driver, or an inter-process communication (IPC) driver.

The middleware 330 may provide a function required by the applications 370 in common or may provide various functions to the applications 370 through the API 360 so that the applications 370 may efficiently use the electronic device's limited system resources. According to an embodiment of the present disclosure, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The run time library 335 may include, for example, a library module that a compiler uses in order to add new functions through a programming language while the application 370 is executed. The run time library 335 may perform input/output management, memory management, a function for an arithmetic function, and the like.

The application manager 341 may manage, for example, a life cycle of at least one application among the applications 370. The window manager 342 may manage a graphical user interface (GUI) resource used in a screen. The multimedia manager 343 may recognize a format required for reproducing various media files, and may encode or decode a media file using a codec appropriate for the corresponding format. The resource manager 344 may manage resources, such as a source code, a memory, or a storage space of at least one application among the applications 370.

The power manager 345 may operate together with a basic input/output system (BIOS) to manage a battery or power, and may provide power information required for the operation of the electronic device. The database manager 346 may generate, search for, or change a database to be used by at least one of the applications 370. The package manager 347 may manage installing or updating applications distributed in the form of a package file.

For example, the connectivity manager 348 may manage wireless connections, such as Wi-Fi, BT, and the like. The notification manager 349 may display or report an event, such as the reception of a message, an appointment, a proximity notification, and the like, to a user without disturbance. The location manager 350 may manage location information of an electronic device. The graphic manager 351 may manage graphic effects to be provided to a user and user interfaces related to the graphic effects. The security manager 352 may provide various security functions required for system security, user authentication, and the like. According to an embodiment of the present disclosure, when an electronic device (for example, electronic device 101) has a call function, the middleware 330 may further include a telephony manager for managing a voice call function or a video call function of the electronic device.

The middleware 330 may include a middleware module for forming a combination of various functions of the aforementioned elements. The middleware 330 may provide a module specialized for each type of operating system in order to provide a differentiated function. In addition, a few existing elements may be dynamically removed from the middleware 330, or a new element may be added to the middleware 330.

The API 360 (for example, the API 145) is a set of API programming functions, and may be provided in a different configuration for each operating system. For example, in the case of Android or iOS, one API set may be provided for each platform. In the case of Tizen, two or more API sets may be provided for each platform.

The applications 370 (for example, the application programs 147) may include, for example, one or more applications that are capable of providing functions, such as a home 371, a dialer 372, a short message service (SMS)/multimedia message service (MMS) 373, an instant message (IM) 374, a browser 375, a camera 376, an alarm 377, contacts 378, a voice dialer 379, an email 380, a calendar 381, a media player 382, an album 383, a clock 384, health care (for example, measuring exercise quantity or blood sugar), environment information (for example, atmospheric pressure, humidity, or temperature information), and the like.

According to an embodiment of the present disclosure, the applications 370 may include an application (hereinafter, referred to as an "information exchange application" for ease of the description) supporting exchanging information between the electronic device (for example, the electronic device 101) and an external electronic device (for example, the first external electronic device 102 or the second external electronic device 104). The information exchange application may include, for example, a notification relay application for transmitting predetermined information to the external electronic device, or a device management application for managing the external electronic device.

For example, the notification relay application may include a function of delivering, to an external electronic apparatus (for example, the first external electronic device 102 or the second external electronic device 104), notification information generated by other applications (for example, an SMS/MMS application, an email application, a health care application, an environmental information application, and the like) of the electronic device. Further, the notification relay application may receive notification information from, for example, an external electronic device, and may provide the received notification information to a user. For example, the device management application may manage (for example, install, delete, or update) at least one function of an external electronic device (for example, the second external electronic device 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment of the present disclosure, the applications 370 may include an application (for example, a health management application) designated according to attributes (for example, attributes of the electronic device, such as the type of electronic device which corresponds to a mobile medical device) of the external electronic device (for example, the first external electronic device 102 or the second external electronic device 104). According to an embodiment of the present disclosure, the applications 370 may include an application received from the external electronic device (for example, the server 106, or the first external electronic device 102 or the second external electronic device 104). According to an embodiment of the present disclosure, the applications 370 may include a preloaded application or a third party application, which can be downloaded from a server. Names of the elements of the program module 310, according to the above-described embodiments of the present disclosure, may change depending on the type of operating system.

According to various embodiments of the present disclosure, at least some of the program module 310 may be implemented in S/W, firmware, H/W, or a combination of two or more thereof. At least some of the programming module 310 may be implemented (for example, executed) by, for example, the processor (for example, the AP 210). At least some of the programming module 310 may include, for example, a module, a program, a routine, sets of instructions, a process, and the like, for performing one or more functions. The term "module" used in embodiments of the present disclosure may refer to, for example, a unit including one or more combinations of H/W, S/W, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an application-specific IC (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a non-transitory computer-readable storage medium in a programming module form. The instruction, when executed by a processor (for example, the processor 120), may cause the one or more processors to execute the function corresponding to the instruction. The non-transitory computer-readable storage medium may be, for example, the memory 130.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Figure 4:
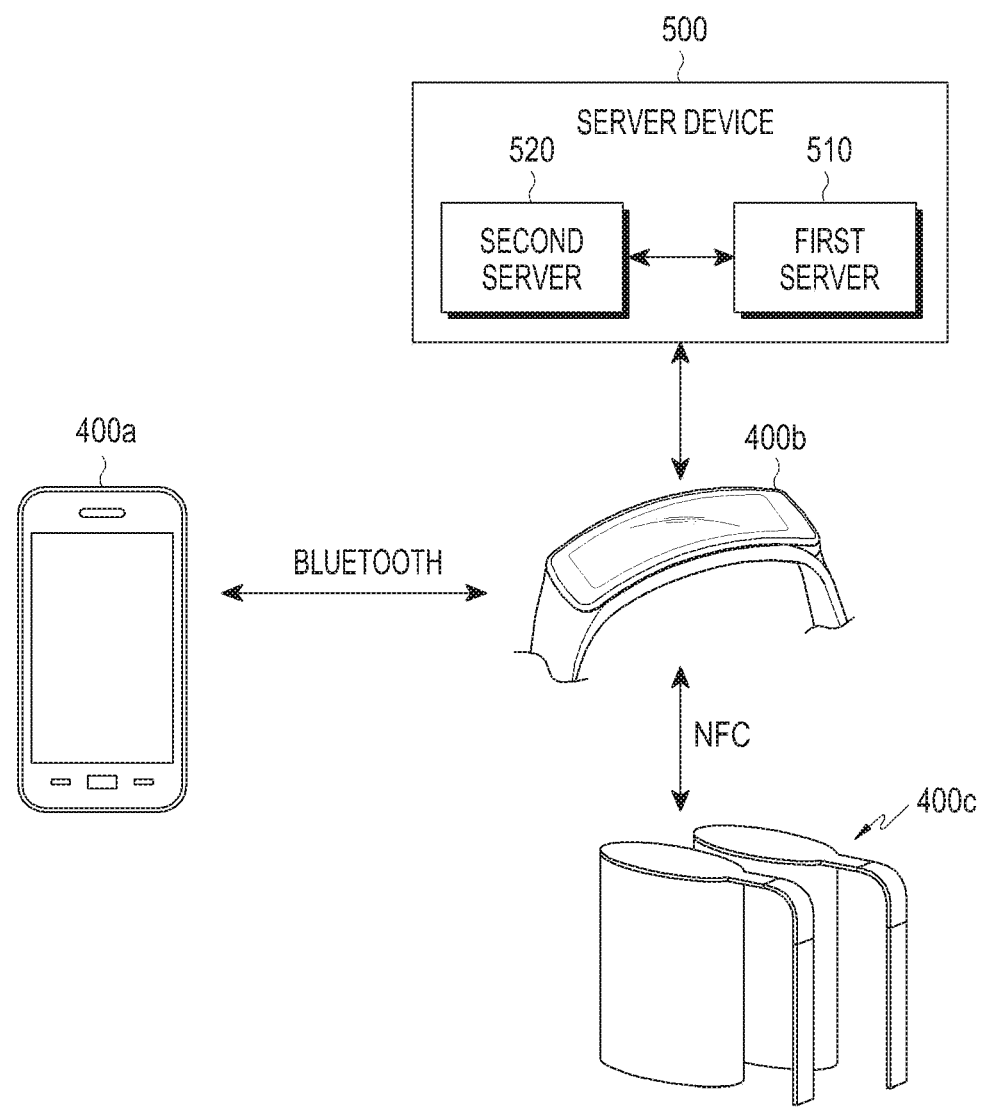
FIG. 4 is a diagram illustrating a secure connection system according to various embodiments of the present disclosure.
Figure 5:
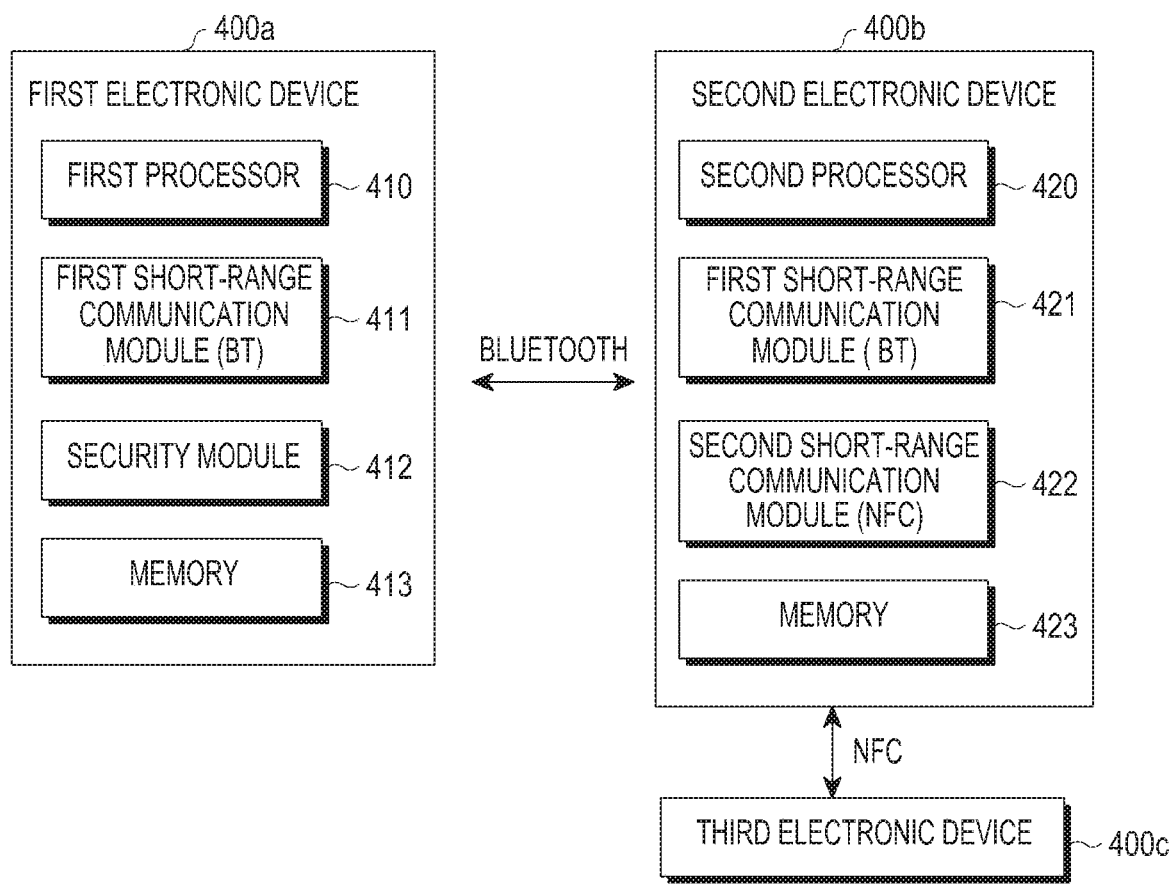
FIG. 5 is a block diagram of a secure connection device according to various embodiments of the present disclosure.

FIG. 4 is a diagram illustrating a secure connection system according to various embodiments of the present disclosure. FIG. 5 is a block diagram of a secure connection device according to various embodiments of the present disclosure. FIG. 5 is a block diagram illustrating a first electronic device 400a and a second electronic device 400b of FIG. 4.

Referring to FIGS. 4 and 5, a secure connection system according to various embodiments may include a first electronic device 400a (for example, the electronic device 101, the first external electronic device 102, or the second external electronic device 104 of FIG. 1 and the electronic device 201 of FIG. 2), a second electronic device 400b (for example, the electronic device 101, the first external electronic device 102, or the second external electronic device 104 of FIG. 1, or the electronic device 201 of FIG. 2), and a server device 500 (for example, the server 106 of FIG. 1).

According to various embodiments of the present disclosure, the first electronic device 400a may include a first processor 410, a first short-range communication module 411 (for example, the BT module 225 of FIG. 2), a security module 412, and a memory 413.

According to various embodiments of the present disclosure, the first processor 410 (for example, the processor 120 of FIG. 1 or the AP 201 of FIG. 2) may encrypt security information stored in the security module 412 using a session key identical to a session key of the second electronic device 400b, and transmits the encrypted security information to the second electronic device 400b that is connected through the first short-range communication module 411.

According to an embodiment of the present disclosure, in the state in which the second electronic device 400b is connected through the first short-range communication module 411 over a first short-range communication (for example, BT), when a first pairing request message is received from the second electronic device 400b, the first processor 410 may transmit, to the second electronic device 400b, a first pairing response message together with unique information (identification (ID)) of the first electronic device 400a. After transmitting the first pairing response message, the first processor 410 may receive, from the second electronic device 400b, a pairing key that registers, on the server device 500, the first electronic device 400a as an electronic device linked to the second electronic device 400b. The first processor 410 may store, in the memory 413, the pairing key to be linked to the unique information (ID) of the electronic device. In addition, the pairing key may be stored in a separate security memory, such as TrustZone, which is prepared in the first processor 410 from the perspective of S/W. In addition, the pairing key may be stored in the security module 412, which is separately configured from the perspective of H/W.

According to an embodiment of the present disclosure, the unique information (ID) of the electronic device 400a may be at least one of unique information (ID) of the security module 412, and unique information (ID) of the security information stored in the security module 412.

According to an embodiment of the present disclosure, after transmitting the first pairing response message to the second electronic device 400b, the first processor 410 may detect a master key that is stored to be linked to the unique information (ID) of the electronic device, from the memory 413, may generate a pairing key using the master key, and may store the pairing key to be linked to the unique information of the electronic device. After transmitting the first pairing response message, the first processor 410 may receive, from the second electronic device 400b, a pairing key that registers, on the server device 500, the first electronic device 400a as an electronic device linked to the second electronic device 400b. When the pairing key stored in the memory 413 and the pairing key received from the second electronic device 400b are identical, the first processor 410 may maintain storing the pairing key. When the pairing key stored in the memory 413 and the pairing key received from the second electronic device 400b are not identical, the first processor 410 may transmit, to the second electronic device 400b, a message indicating that the pairing keys are different, and may delete the pairing key stored in the memory 413.

According to an embodiment of the present disclosure, when a second pairing request message is transmitted from the second electronic device 400b that is connected over a first short-range communication, the first processor 410 generates a first random number and transmits the first random number to the second electronic device 400b. After transmitting the first random number to the second electronic device 400b, when a second random number and a first authentication key are received from the second electronic device 400b, the first processor 410 may generate a second authentication key using the first random number, the second random number, and the pairing key. The first processor 410 may compare the first authentication key received from the second electronic device 400b and the second authentication key, and when the first authentication key and the second authentication key are identical, the first processor 410 may transmit, to the second electronic device 400b, a second pairing response message together with session key generation information.

According to an embodiment of the present disclosure, when the first authentication key and the second authentication key are identical, the first processor 410 may generate a session key using the session key generation information, may encrypt security information stored in the security module 412 using the session key, and may transmit the encrypted security information to the second electronic device 400b.

According to an embodiment of the present disclosure, the first processor 410 may generate the session key generation information including at least one of stamp (Timestamp) information and count information of the first electronic device 400a.

According to an embodiment of the present disclosure, the first processor 410 may designate an expiration date of the session key using the stamp (Timestamp) information out of the session key generation information.

According to various embodiments of the present disclosure, the security module 412 may store security information required for executing a service through a second short-range communication module (for example, the NFC module 228 of FIG. 2).

According to an embodiment of the present disclosure, the security module 412 may include at least one of an embedded secure element (eSE) chip, a universal integrated circuit card (UICC) chip, an embedded UICC (eUICC) chip, and a host card emulation (HCE) chip.

According to an embodiment of the present disclosure, the security module 412 may store a pairing key that registers, on the server device 500, the first electronic device 400a as an electronic device linked to the second electronic device 400b, which is received from the second electronic device 400b.

According to an embodiment of the present disclosure, the security module 412 may be configured to be fixed to the first electronic device 400a or to be detachable from the first electronic device 400a. For example, when the security module 412 is an eSE chip, it may be configured to be fixed to the first electronic device 400a, or when the security module 412 is a UICC chip, it may be configured to be detachable from the first electronic device 400a.

According to various embodiments of the present disclosure, the memory 413 may store the unique information (ID) of the first electronic device 400a and a pairing key to be linked to each other, or may store the unique information (ID) of the first electronic device 400a, a master key, and a pairing key to be linked to one another.

According to an embodiment of the present disclosure, the memory 413 may store a session key identical to that of the second electronic device 400b, and may store an application (for example, a pairing managing application) that is capable of transmitting encrypted security information to the second electronic device 400b using the session key.

According to various embodiments of the present disclosure, the second electronic device 400b may include a second processor 420, a first short-range communication module 421 (for example, the BT module 225 of FIG. 2), a second short-range communication module 422 (for example, the NFC module 228 of FIG. 2), and a memory 423.

According to various embodiments of the present disclosure, the second processor 420 (for example, the processor 120 of FIG. 1 or the AP 201 of FIG. 2) may receive security information, which has been encrypted using a session key, from the first electronic device 400a that is connected through the first short-range communication module 421, and may transmit, to a third electronic device 400c that is connected through the second short-range communication module 422, the security information decoded through a session key identical to the session key of the first electronic device 400a.

According to an embodiment of the present disclosure, the second processor 420 may transmit a first pairing request message as a general pairing request, to the first electronic device 400a that is connected over a first short-range communication. When the unique information (ID) of the first electronic device is received together with a first pairing response message from the first electronic device 400a, the second processor 420 may transmit the unique information (ID) of the first electronic device to a server device 500 together with user information of the second electronic device (for example, an ID and a password registered on a first server 510). When a pairing key that registers the first electronic device 400a as an electronic device linked to the second electronic device 400b, is received from the server device 500, the second processor 420 may transmit the pairing key to the first electronic device 400a.

According to an embodiment of the present disclosure, the second processor 420 may transmit a second pairing request message to the first electronic device 400a as a security pairing request after transmitting the pairing key to the first electronic device 400a. The second processor 420 may transmit, to the server device 500, a first random number that is received from the first electronic device after the transmission of the second pairing request message. The second processor 420 may transmit, to the first electronic device 400a, a second random number and a first authentication key, which are received from the server device 500. When session key generation information (for example, time stamp information or count information) is received together with a second pairing response message from the first electronic device 400a, after the transmission of the second random number and the first authentication key, the second processor 420 may transmit the session key generation information to the server device 500. When a session key is received from the server device 500 after the transmission of the session key generation information, the second processor 420 may decode, using the session key, encrypted security information that is received from the first electronic device 400a. The second processor 210 transmits the security information, which is received from the first electronic device 400a, to the third electronic device 400c (for example, an NFC reader) that is connected over a second short-range communication, and completes authentication, and executes a service using the third electronic device 400c.

According to various embodiments of the present disclosure, a memory 423 may store user information (for example, an ID and a password) of the second electronic device, which is registered on the server device 500.

According to an embodiment of the present disclosure, the memory 423 may store a session key identical to that of the first electronic device 400a, and may store an application (for example, a pairing managing application) that is capable of decoding, using the session key, encrypted security information that is received from the first electronic device 400a.

According to various embodiments of the present disclosure, the server device 500 may include the first server 510 and a second server 520. According to an embodiment of the present disclosure, the server device 500 may be separated into the first server 510 and the second server 520, or the first server 510 and the second server 520 may be integrated.

According to various embodiments of the present disclosure, the first server 510 may register the first electronic device 400a as an electronic device linked to the second electronic device 400b using the pairing key, may generate a session key that allows the reception of security information of the first electronic device, and may transmit the session key to the second electronic device 400b.

According to an embodiment of the present disclosure, the first server 510 may include a processor (not illustrated), and may execute a function of a paging managing server.

According to an embodiment of the present disclosure, the first server 510 may receive, from the second electronic device 400b, the user information (for example, an ID and a password) of the second electronic device 400b and the unique information (ID) of the first electronic device 400a. When it is determined that the user information of the second electronic device 400b is information registered on the first server 510, the first server 510 determines that the authentication with respect to the second electronic device 400*b* is successful, and may store the unique information (ID) of the first electronic device 400*a* to be linked to the user information of the second electronic device 400*b*. When the authentication with respect to the second electronic device 400*b* is successful, the first server 510 may transmit the unique information (ID) of the first electronic device 400*a* to the second server 520. After the transmission of the unique information (ID) of the first electronic device 400*a*, when a pairing key is received from the second server 520, the first server 510 may store the pairing key to be linked to the user information of the second electronic device 400*b* and the unique information (ID) of the first electronic device 400*a*, and may transmit the pairing key to the second electronic device 400*b*.

According to an embodiment of the present disclosure, after the transmission of the pairing key, when a first random number is received from the second electronic device 400*b*, the first server 510 may generate a second random number, may generate a first authentication key using the first random number, the second random number, and the pairing key, and may transmit the second random number and the first authentication key to the second electronic device 400*b*. After the transmission of the second random number and the first authentication key, when session key generation information is received from the second electronic device 400*b*, the first server 510 may generate a session key using the session key generation information, and may transmit the session key to the second electronic device 400*b*.

According to various embodiments of the present disclosure, the second server 520 may generate a pairing key using a master key that corresponds to the unique information of the first electronic device.

According to an embodiment of the present disclosure, the second server 520 may include a processor (not illustrated), and may execute a function of a key managing server.

According to an embodiment of the present disclosure, when the unique information (ID) of the first electronic device 400*a* is received from the first server 510, the second server 520 may detect, from a database (DB), a master key that is stored to be linked to the first electronic device 400*a*, and may transmit the pairing key generated using the master key to the first server 510.

According to an embodiment of the present disclosure, the first short-range communication module 411 may execute short-range communication with the second electronic device, the security module 412 may store security information, and the first processor 410 may be configured to receive, from the second electronic device, a pairing key that registers the electronic device as an electronic device linked to the second electronic device, transmit session key generation information to the second electronic device when authentication with respect to the second electronic device is completed using the pairing key, generate a session key using the session key generation information, and encrypt the security information and transmit the encrypted security information to the second electronic device.

According to various embodiments of the present disclosure, the first processor 410 may be configured to transmit, to the second electronic device, when a first pairing request message is received from the second electronic device, a first pairing response message together with unique information of the electronic device, and store, when the pairing key is received from the second electronic device, the pairing key to be linked to the unique information of the electronic device.

According to various embodiments of the present disclosure, the first processor 410 may be configured to generate a first random number and transmit the generated first random number to the second electronic device, when a second pairing request message is received from the second electronic device, generate, when a second random number and a first authentication key are received from the second electronic device, a second authentication key using the first random number, the second random number, and the pairing key, and transmit, to the second electronic device, when the first authentication key and the second authentication key are identical, a second pairing response message together with session key generation information.

According to various embodiments of the present disclosure, the first processor 410 may be configured to generate, when the first authentication key and the second authentication key are identical, the session key using the session key generation information.

According to various embodiments of the present disclosure, the session key generation information includes at least one of time stamp (Timestamp) information and count information. According to various embodiments of the present disclosure, the first short-range communication module 421 may execute short-range communication with a first electronic device, the second short-range communication module 422 may execute short-range communication with a third electronic device, and the processor may 420 be configured to transmit, when a pairing key, which registers the first electronic device as an electronic device linked to the electronic device, is received from a server device, the pairing key to the first electronic device, and transmit, to the server device, session key generation information received from the first electronic device, decode encrypted security information that is received from the first electronic device, using a session key received from the server device, and transmit the decoded information to the third electronic device.

Timestamp refers to a time stamp when the first electronic device authenticates the first server, and is a factor used when the first server generates a session key. Timestamp varies for each session and thus, a session key generated using Timestamp is generated to be different for each time. In addition, Timestamp is a reference used when the first server maintains a session during a predetermined period of time, and indicates a period of time for using a session key.

Count indicates the number of sessions that are connected to the first server up to date in the first electronic device, and is a factor used when the first server generates a session key. Count in association with a connection between the first electronic device and the first server varies over time and thus, a session key is generated to be different for each time. In addition, the first server and the first electronic device have an identical count value and thus, when the first server receives a different count value, there is a high probability of an abnormal connection. Accordingly, Count may detect an abnormal connection.

According to various embodiments of the present disclosure, the second processor 420 may be configured to transmit, when a first pairing response message is received together with unique information of the first electronic device, from the first electronic device, in response to a first pairing request message, the unique information of the first electronic device together with user information of the electronic device to the server device, and receive the pairing key from the server device.

According to various embodiments of the present disclosure, the second processor 420 may be configured to transmit, when a first random number is received from the first electronic device in response to the transmission of a second pairing request message, the first random number to the server device, and transmit a second random number and a first authentication key received from the server device, to the first electronic device, and receive session key generation information from the first electronic device.

According to various embodiments of the present disclosure, the session key generation information includes at least one of time stamp (Timestamp) information and count information. According to various embodiments of the present disclosure, a processor of the server device 500 may be configured to generate and store a pairing key for registering a first electronic device as being linked to an electronic device, using unique information of the first electronic device received from the electronic device, and transmitting the pairing key to the electronic device, and generating a session key identical to a session key of the first electronic device using session key generation information of the first electronic device received from the electronic device, and transmitting the session key to the electronic device.

According to various embodiments of the present disclosure, the processor of the server device 500 may be configured to perform, when user information of the electronic device and unique information of the first electronic device are received from the electronic device, authentication with respect to the electronic device using the user information of the electronic device, and generate and store the pairing key using a master key that corresponds to the unique information of the first electronic device, when the authentication with respect to the electronic device is completed.

According to various embodiments of the present disclosure, the processor of the server device 500 may be configured to generate, when a first random number is received from the electronic device, a second random number, generate a first authentication key using the first random number, the second random number, and the pairing key, and transmit the second random number and the first authentication key to the electronic device, and receive session key generation information of the first electronic device from the electronic device.

According to various embodiments of the present disclosure, the session key generation information may include at least one of time stamp (Timestamp) information and count information.

Figure 6A:
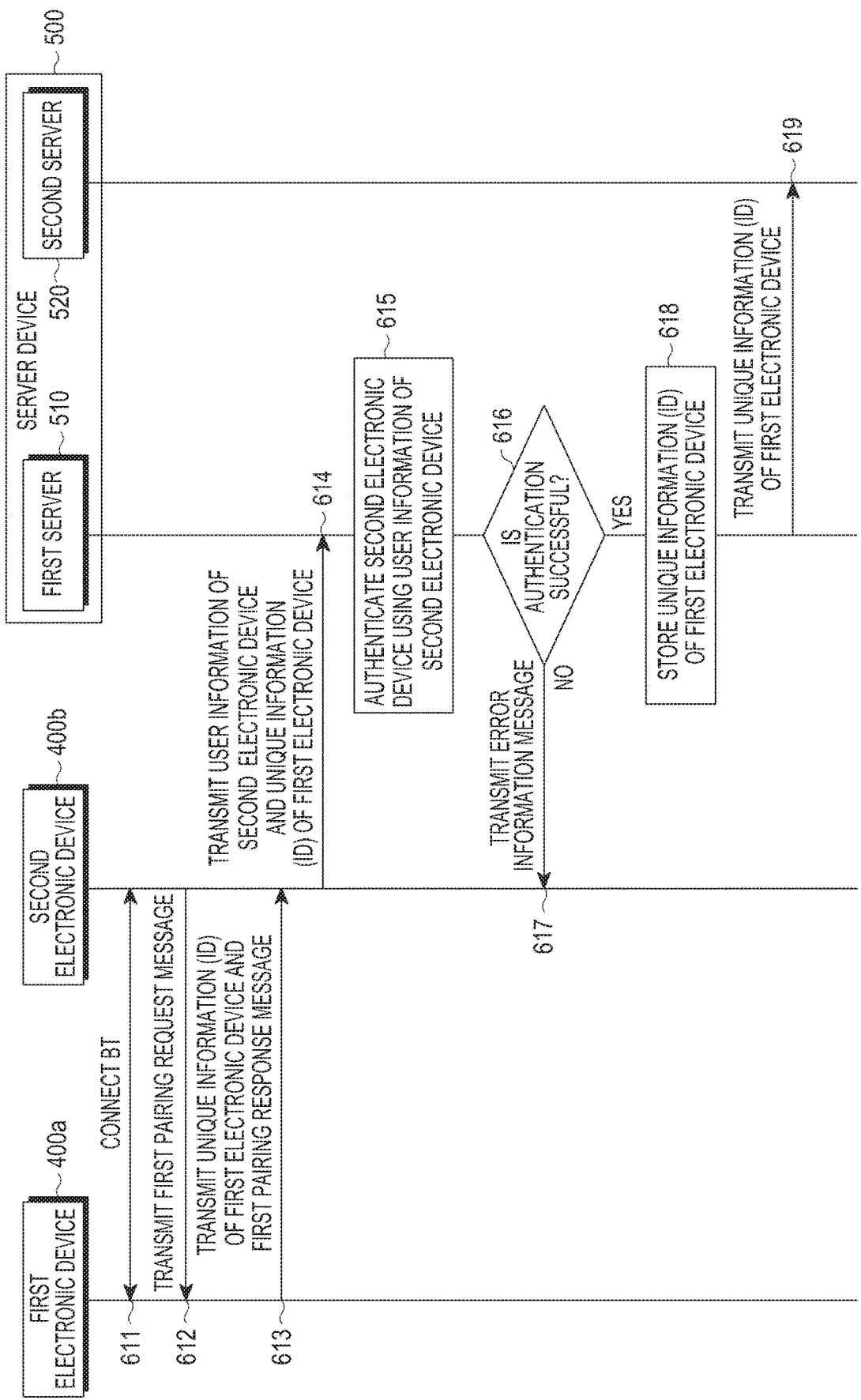
FIGS. 6A and 6B are flowcharts illustrating a registration method for a secure connection according to various embodiments of the present disclosure.
Figure 6B:
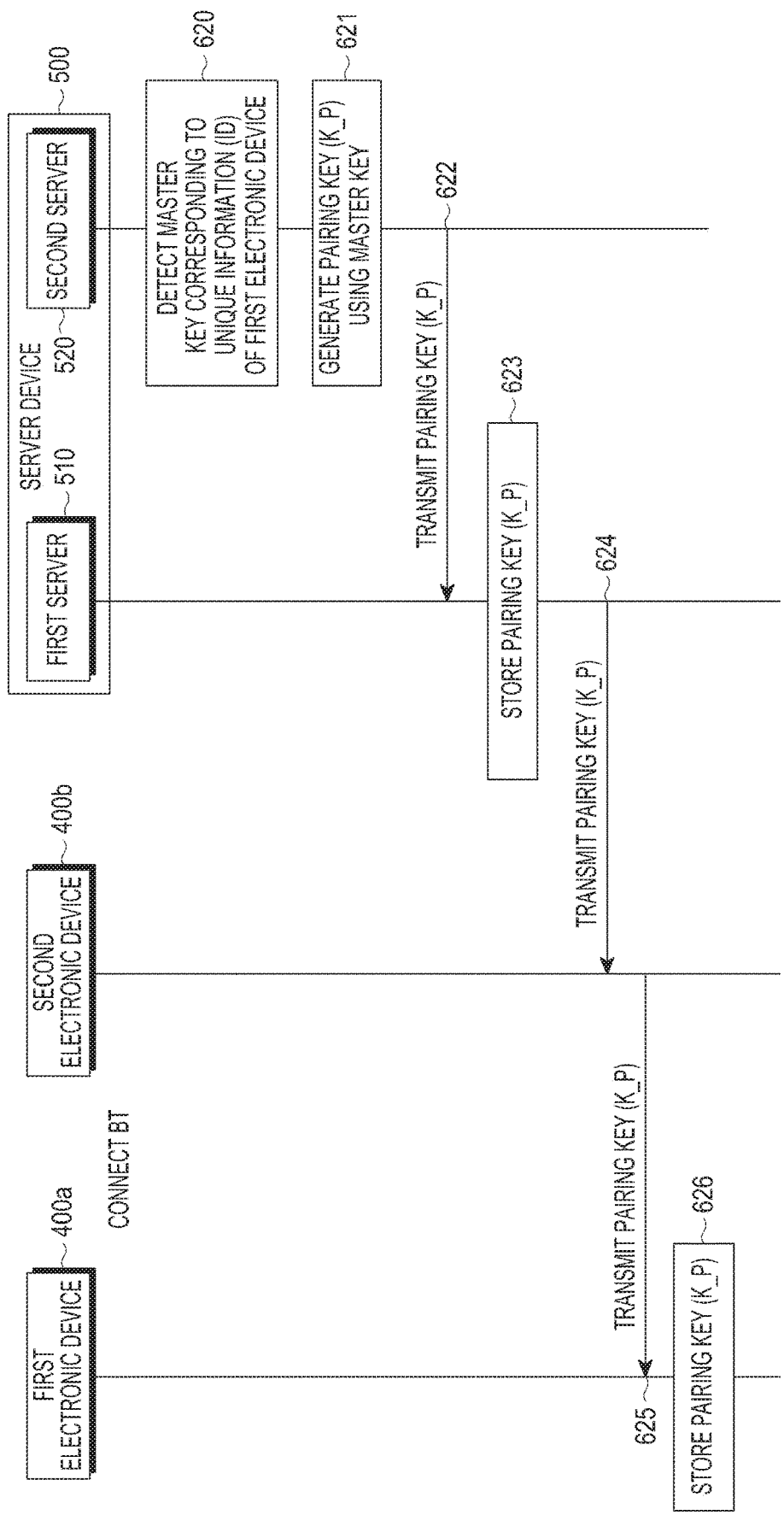

FIGS. 6A and 6B are flowcharts illustrating a registration method for a secure connection according to various embodiments of the present disclosure.

Referring to FIGS. 6A and 6B, a registration method for a secure connection according to various embodiments of the present disclosure is described through an example executed by the first electronic device 400a, the second electronic device 400b, and the server device 500 of FIGS. 4 and 5. With reference to FIGS. 6A and 6B, in operation 611, the first electronic device 400a (for example, the first processor 410) and the second electronic device 400b (for example, the second processor 420) are connected through a first short-range communication (for example, BT communication).

In operation 612, the second electronic device 400b transmits a first pairing request message, which is a general pairing request, to the first electronic device 400a.

In operation 613, the first electronic device 400a transmits, to the second electronic device 400b, a first pairing response message together with the unique information (for example, the unique information of security information) of the first electronic device.

In operation 614, when the unique information of the first electronic device is received from the first electronic device 400a, the second electronic device 400b transmits, to the first server 510, the user information (for example, an ID and a password) of the second electronic device and the unique information of the first electronic device.

In operation 615, the first server 510 (for example, a processor) executes authentication with respect to the second electronic device based on whether the user information of the second electronic device 400b exists from among a plurality of pieces of user information stored in the DB of the first server 510.

In operation 616, the first server 510 determines that the authentication fails when the user information of the second electronic device 400b does not exist among the plurality of pieces of user information stored in the DB of the first server 510, and in operation 617, transmits an error information message to the second electronic device 400b in response to the failure of the authentication.

In operation 616, the first server 510 determines that the authentication is successful when the user information of the second electronic device 400b exists among the plurality of pieces of user information stored in the DB of the first server 510, and in operation 618, stores the unique information of the first electronic device to be linked to the user information of the second electronic device in the DB of the first server.

In operation 619, the first server 510 transmits the unique information of the first electronic device to the second server 520.

In operation 620, the second server 520 detects, from the DB of the second server 520, a master key stored to correspond to the unique information of the first electronic device when the unique information of the first electronic device is received from the first server 510. The second server 520 generates a pairing key (K_P) using the detected master key in operation 621, and transmits the pairing key (K_P) to the first server 510 in operation 622.

In operation 623, when the pairing key (K_P) is received from the second server 520, the first server 510 stores, in the DB of the first server, the pairing key (K_P) to be linked to the user information of the second electronic device and the unique information of the first electronic device, thereby registering the first electronic device 400a as an electronic device linked to the second electronic device 400b using the pairing key (K_P).

In operation 624, the first server 510 transmits the pairing key (K_P) to the second electronic device 400b.

In operation 625, when the pairing key (K_P) that registers the first electronic device 400a as an electronic device linked to the second electronic device 400b is received from the first server 510, the second electronic device 400b transmits the pairing key (K_P) to the first electronic device 400a.

In operation 626, when the pairing key (K_P) that registers the first electronic device 400a as an electronic device associated the second electronic device 400b is received from the second electronic device 400b, the first electronic device 400a stores the pairing key (K_P) to be linked to the unique information of the first electronic device.

Figure 7A:
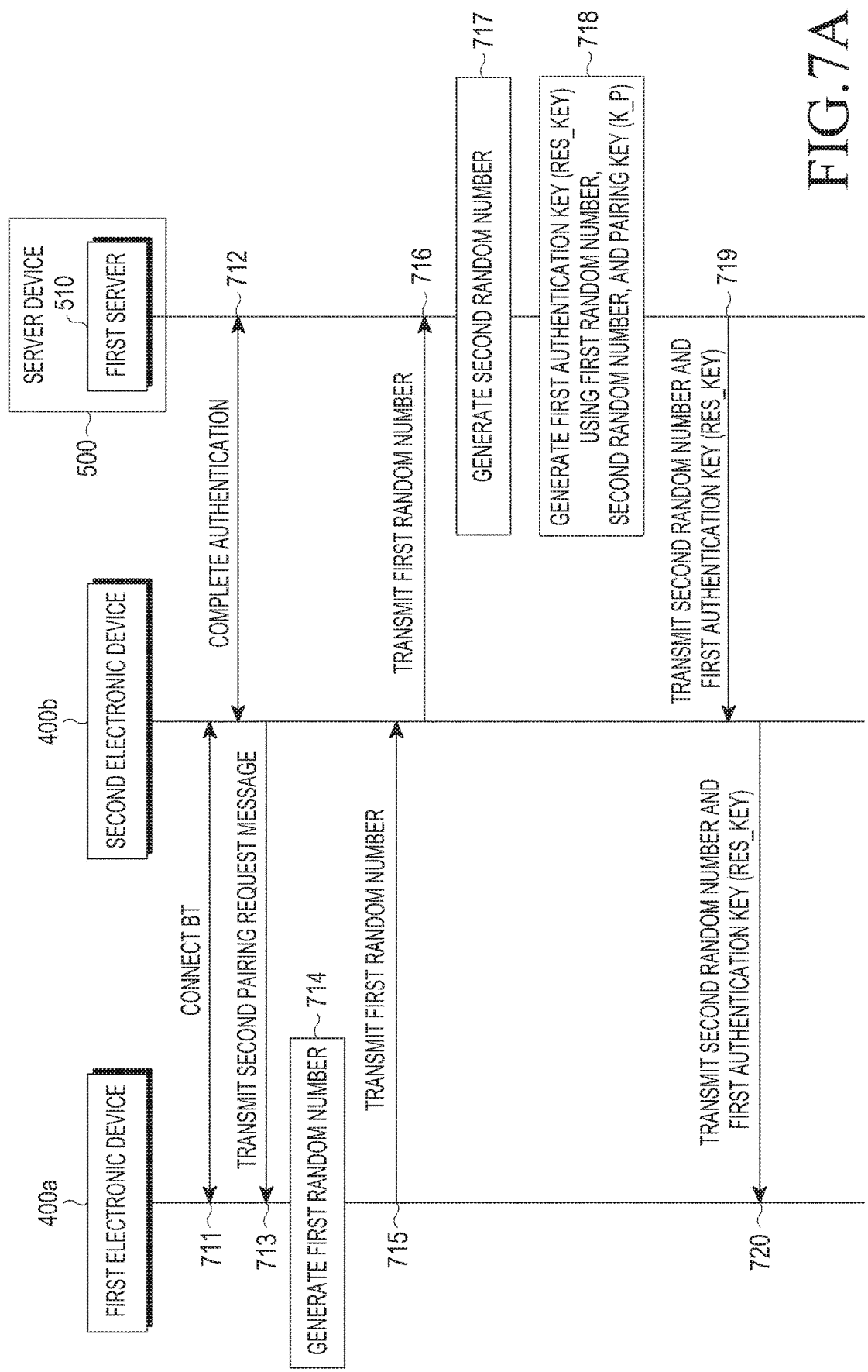
FIGS. 7A and 7B are flowcharts illustrating a secure connection method according to various embodiments of the present disclosure.
Figure 7B:
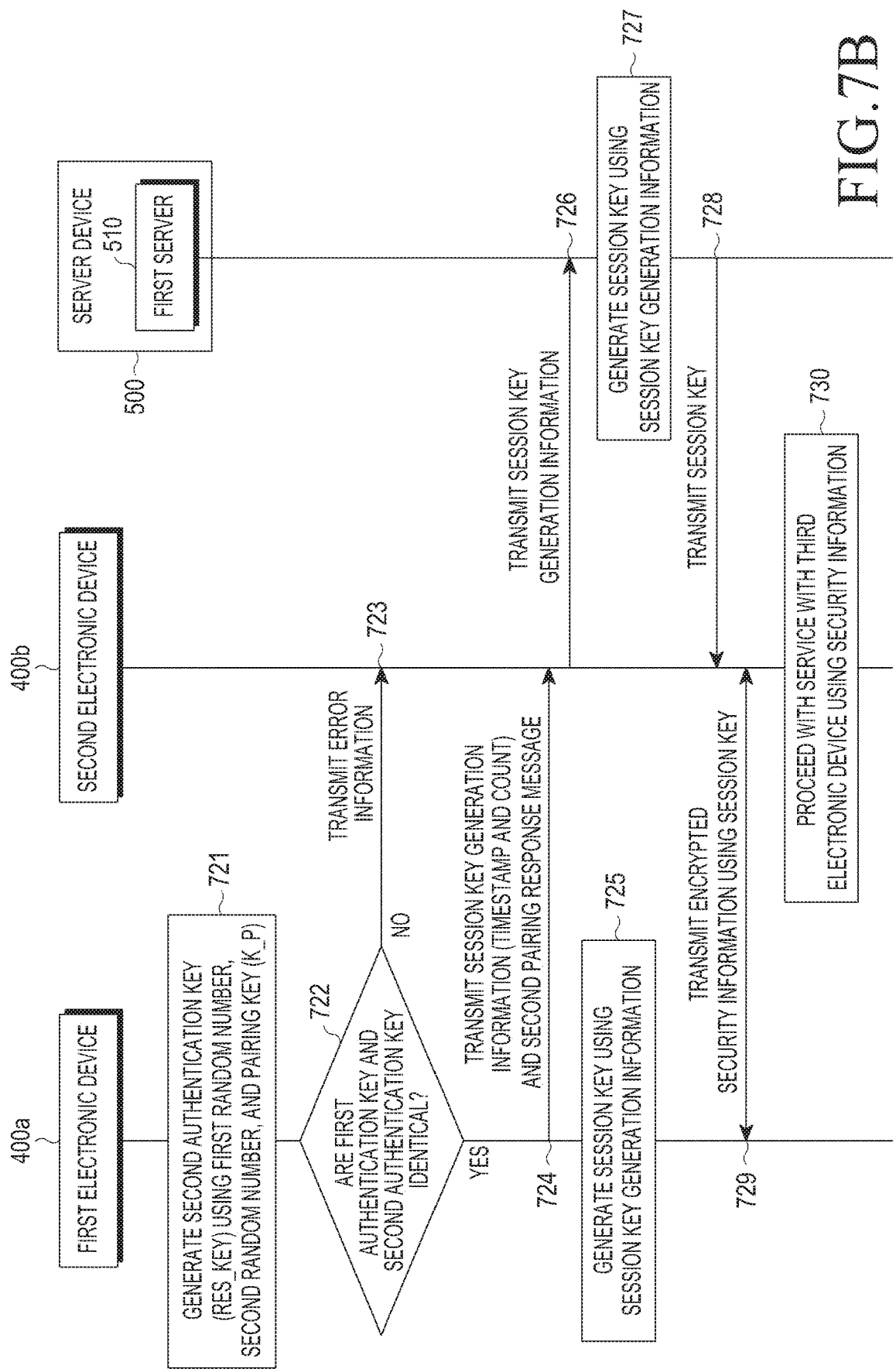

FIGS. 7A and 7B are flowcharts illustrating a secure connection method according to various embodiments of the present disclosure.

Referring to FIGS. 7A and 7B, a secure connection method, according to various embodiments of the present disclosure, is described through an example executed by the first electronic device 400a, the second electronic device 400b, and the server device 500 of FIGS. 4 and 5. A secure connection method of FIGS. 7A and 7B, according to various embodiments of the present disclosure, may be executed after executing a registration method for secure connection of FIGS. 6A and 6B according to various embodiments of the present disclosure. With reference to FIGS. 7A and 7B, in operation 711, the first electronic device 400a (for example, the first processor 410) and the second electronic device 400b (for example, the second processor 420) may be connected through a first short-range communication (for example, BT communication).

In operation 712, as the second electronic device 400b transmits the user information of the second electronic device to the first server 510 through the web and determines that the authentication is successful, the second electronic device 400b may be connected to the first server 510.

In operation 713, after the registration of FIGS. 6A and 6B, the second electronic device 400b may transmit a second pairing request message, which is a security pairing request, to the first electronic device 400a.

In operation 714, when the second pairing request message is received from the second electronic device 400b, the first electronic device 400a generates a first random number in operation 714, and transmits the first random number to the second electronic device 400b in operation 715.

In operation 716, when the first random number is received from the first electronic device 400a, the second electronic device 400b transmits the first random number to the first server 510 (for example, the processor).

In operation 717, when the first random number is received from the second electronic device 400b, the first server 510 generates a second random number.

In operation 718, the first server 510 generates a first authentication key (Res_Key) using at least one of the first random number, the second random number, and the pairing key (K_P).

In operation 719, the first server 510 transmits the second random number and the first authentication key (Res_Key) to the second electronic device 400b.

In operation 720, when the second random number and the first authentication key (Res_key) are received from the first server 510, the second electronic device 400b transmits the second random number and the first authentication key (Res_Key) to the first electronic device 400a.

In operation 721, when the second random number and the first authentication key (Res_Key) are received from the second electronic device 400b, the first electronic device 400a generates a second authentication key (Res_Key) using at least one of the first random number, the second random number, and the pairing key (K_P).

In operation 722, the first electronic device 400a compares the first authentication key received from the second electronic device 400b and the generated second authentication key. When the first authentication key and the second authentication key are different in operation 722, the first electronic device 400a transmits, to the second electronic device 400b, an error message indicating that the authentication keys are different in operation 723. When the first authentication key and the second authentication key are identical in operation 722, the first electronic device 400a transmits a second pairing response message together with the session key generation information (for example, time stamp (Timestamp) information and count information) to the second electronic device 400b in operation 724.

In operation 725, the first electronic device 400a generates a session key (K_S) using the session key generation information (for example, time stamp (Timestamp) information and count information).

In operation 726, when the session key generation information and the second pairing response message are received from the first electronic device 400a, the second electronic device 400b transmits the session key generation information to the first server 510.

In operation 727, when the session key generation information is received from the second electronic device 400b, the first server 510 generates a session key (K_S) using the session key generation information.

In operation 728, the first server 510 transmits the session key (K_S) to the second electronic device 400b.

In operation 729, the first electronic device 400a encrypts security information stored in the security module 412 of the first electronic device 400a using the session key (K_S) that is identical to that of the second electronic device 400b, and transmits the encrypted security information to the second electronic device 400b. When the encrypted security information is received from the first electronic device 400a in operation 729, the second electronic device 400b decodes the security information using the session key.

In operation 730, when the second electronic device 400b transmits the security information received from the first electronic device 400a to the third electronic device 400c (for example, an NFC reader) and determines that the authentication is completed, the second electronic device 400b may proceed with a service (for example, NFC payment service) with the third electronic device 400c.

According to various embodiments of the present disclosure, a secure connection method of an electronic device is provided. The method includes receiving a pairing key that registers the electronic device as an electronic device that is linked to a second electronic device from the second electronic device that is connected over a first short-range communication, transmitting session key generation information to the second electronic device when authentication with respect to the second electronic device is completed using the pairing key, and generating a session key using the session key generation information, encrypting security information through the session key, and transmitting the encrypted information to the second electronic device.

According to various embodiments of the present disclosure, the operation of receiving the pairing key includes transmitting, to the second electronic device, when a first pairing request message is received from the second electronic device, a first pairing response message together with unique information of the electronic device, and storing, when the pairing key is received from the second electronic device, the pairing key to be linked to the unique information of the electronic device.

According to various embodiments of the present disclosure, the operation of transmitting the session key generation information includes generating, when a second pairing request message is received from the second electronic device, a first random number and transmitting the first random number to the second electronic device, generating, when a second random number and a first authentication key are received from the second electronic device, a second authentication key using the first random number, the second random number, and the pairing key, and transmitting, to the second electronic device, when the first authentication key and the second authentication key are identical, a second pairing response message together with the session key generation information.

According to various embodiments of the present disclosure, when the first authentication key and the second authentication key are identical, the method further includes generating the session key using the session key generation information.

According to various embodiments of the present disclosure, the session key generation information includes at least one of time stamp (Timestamp) information and count information.

According to various embodiments of the present disclosure, a secure connection method of an electronic device is provided. The method includes transmitting, when a pairing key that registers a first electronic device as an electronic device linked to the electronic device is received from a server device, the pairing key to the first electronic device that is connected over a first short-range communication, transmitting, to the server device, session key generation information received from the first electronic device, and decoding, when a session key is received from the server device, encrypted security information that is received from the first electronic device, using the session key, and transmitting the decoded information to a third electronic device that is connected over a second short-range communication.

According to various embodiments of the present disclosure, the operation of transmitting to the first electronic device includes transmitting a first pairing request message, transmitting, to the server device, the unique information of the first electronic device together with the user information of the electronic device when a first pairing response message is received together with the unique information of the first electronic device, from the first electronic device, in response to the first pairing request message, and receiving the pairing key from the server device.

According to various embodiments of the present disclosure, the operation of transmitting to the server device, includes transmitting a second pairing request message, transmitting, when a first random number is received from the first electronic device in response to transmission of the second pairing request message, the first random number to the server device, transmitting, when a second random number and a first authentication key are received from the server device, the second random number and the first authentication key to the first electronic device, and receiving the session key generation information from the first electronic device.

According to various embodiments of the present disclosure, the session key generation information includes at least one of time stamp (Timestamp) information and count information.

According to various embodiments of the present disclosure, a secure connection method of a server device is provided. The method includes generating and storing, when unique information of a first electronic device is received from an electronic device, a pairing key for registering the first electronic device as an electronic device linked to the electronic device, using the unique information of the first electronic device, and transmitting the pairing key to the electronic device, and generating, when session key generation information of the first electronic device is received from the electronic device, a session key identical to a session key of the first electronic device using the session key generation information, and transmitting the session key to the electronic device.

According to various embodiments of the present disclosure, the operation of transmitting the pairing key to the electronic device includes executing, when user information of the electronic device and unique information of the first electronic device are received from the electronic device, authentication with respect to the electronic device using the user information of the electronic device, and generating and storing, when the authentication with respect to the electronic device is completed, the pairing key using a master key that corresponds to the unique information of the first electronic device.

According to various embodiments of the present disclosure, the operation of transmitting the session key to the electronic device includes generating, when a first random number is received from the electronic device, a second random number, generating a first authentication key using the first random number, the second random number, and the pairing key, transmitting the second random number and the first authentication key to the electronic device, and receiving session key generation information of the first electronic device from the electronic device.

According to various embodiments of the present disclosure, the session key generation information includes at least one of Timestamp information and count information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A first electronic device comprising:
a first short-range communication module configured to execute short-range communication with a second electronic device;
a security module configured to store security information; and
a processor configured to:
receive a first pairing request message from a second electronic device via the first short-range communication module,
control the first short-range communication module to transmit a first pairing response message together with unique information of the first electronic device to the second electronic device, wherein the unique information is transmitted to a server device via the second electronic device,
receive, from the server device via the second electronic device, a pairing key generated by the server device based on the unique information,
store, in a memory of the first electronic device, the received pairing key, when a second pairing request message for security pairing is received from the second electronic device, control the first short-range communication module to transmit session key generation information to the server device via the second electronic device,
generate a session key based on the session key generation information,
encrypt the security information based on the session key, and
control the first short-range communication module to transmit the encrypted security information to the server device via the second electronic device.

2. The first electronic device of claim 1, wherein the processor is further configured to:
generate a first random number and transmit the generated first random number to the server device via the second electronic device, when a second pairing request message is received from the second electronic device,
generate, when a second random number and a first authentication key are received from the second electronic device, a second authentication key based on the first random number, the second random number, and the pairing key, and transmit, to the server device via the second electronic device, when the first authentication key and the second authentication key are identical, a second pairing response message together with session key generation information.

3. The first electronic device of claim 2, wherein the processor is further configured to:

generate, when the first authentication key and the second authentication key are identical, the session key based on the session key generation information.

4. The first electronic device of claim 1, wherein the session key generation information comprises at least one of time stamp (Timestamp) information or count information.

5. A secure connection method of a first electronic device, the method comprising:

receiving a first pairing request message from a second electronic device via a first short-range communication module;

controlling the first short-range communication module to transmit a first pairing response message together with unique information of the first electronic device to the second electronic device, wherein the unique information is transmitted to a server device via the second electronic device;

receiving, from the server device via the second electronic device, a pairing key generated by the server device based on the unique information;

storing, in a memory of the first electronic device, the received pairing key, when a second pairing request message for security pairing is received from the second electronic device; controlling the first short-range communication module to transmit session key generation information to the server device via the second electronic device;

generating a session key based on the session key generation information, encrypting security information through the session key; and controlling the first short-range communication module to transmit the encrypted security information to the server device via the second electronic device.

6. The method of claim 5, wherein the transmitting of the session key generation information comprises:

generating a first random number and transmitting the first random number to the server device via the second electronic device, when a second pairing request message is received from the second electronic device;

generating, when a second random number and a first authentication key are received from the second electronic device, a second authentication key based on the first random number, the second random number, and the pairing key; and transmitting, to the server device via the second electronic device, when the first authentication key and the second authentication key are identical, a second pairing response message together with the session key generation information.

7. The method of claim 6, wherein, when the first authentication key and the second authentication key are identical, further comprising:

generating the session key based on the session key generation information.

8. The method of claim 5, wherein the session key generation information comprises at least one of time stamp (Timestamp) information or count information.

9. A non-transitory computer-readable recording medium having recorded therein a program comprising executable instructions which, when executed by a processor of a first electronic device, causes the processor to perform operations comprising:

receiving a first pairing request message from a second electronic device via a first short-range communication module;

controlling the first short-range communication module to transmit a first pairing response message together with unique information of the first electronic device to the second electronic device, wherein the unique information is transmitted to a server device via the second electronic device;

receiving, from the server device via the second electronic device, a pairing key generated by the server device based on the unique information;

storing, in a memory of the first electronic device, the received pairing key, when a second pairing request message for security pairing is received from the second electronic device; controlling the first short-range communication module to transmit session key generation information to the server device via the second electronic device;

generating a session key based on the session key generation information, encrypting security information through the session key; and controlling the first short-range communication module to transmit the encrypted security information to the server device via the second electronic device.

* * * * *